United States Patent Office 2,817,674
Patented Dec. 24, 1957

2,817,674

PREPARATION OF DICYCLOPENTADIENYLIRON FROM CYCLOPENTADIENE AND PYROPHORIC FERROUS OXIDE

Peter J. Graham, Kennett Square, Pa., and Gerald M. Whitman, Hockessin, Del., assignors to E. I. du Pont de Nemours & Company, Wilmington, Del., a corporation of Delaware No Drawing. Application November 8, 1952
Serial No. 319,602

9 Claims. (Cl. 260—439)

This invention relates to a new process for the preparation of an organometallic compound. More particularly it is concerned with the preparation of dicyclopentadienyliron.

Dicyclopentadienyliron, which has utility as an anti-knock agent in spark ignition engines, has been prepared by the reaction of cyclopentadienylmagnesium halide with anhydrous ferric chloride as disclosed by Kealy and Pauson, Nature, 168, 1039 (1951). This compound is represented by the formula

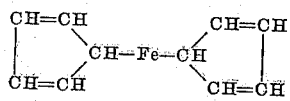

This process is disadvantageous in that volatile and highly inflammable solvents are employed and is expensive since a Grignard reagent must be prepared and used.

This invention has as an object the provision of a process for the direct preparation of dicyclopentadienyliron. Another object is a process avoiding the use of volatile solvents, e. g., ethers and associated anhydrous conditions. A further object is a process dispensing with the preparation and use of hydrocarbon magnesium halides. Other objects will appear hereinafter.

These objects are accomplished by the process of the present invention wherein dicyclopentadienyliron is obtained by reacting cyclopentadiene with pyrophoric ferrous oxide at a temperature of about 300 to 450° C. In a preferred embodiment of this invention, the pyrophoric ferrous oxide is obtained by decomposition of a suitable ferrous salt at a temperature of 300 to 450° C. in the presence of cyclopentadiene. This method of preparation requires but a very short reaction time and the dicyclopentadienyliron that is produced sublimes from the reaction vessel and is condensed upon cooling of the vapor. Further purification is generally unnecessary.

The following examples in which parts are by weight unless otherwise specified are illustrative of the invention.

*Example I*

Ten grams of ferrous oxalate dihydrate was placed in a "Pyrex" tube between two glass cotton plugs and heated in a horizontal oven. Nitrogen gas was passed over the ferrous oxalate at 80 ml./min. while the temperature was quickly raised to 350° C. As soon as no more water was evolved and the temperature was 350° C., cyclopentadiene monomer was introduced by passing the nitrogen gas through a gas dispersion disc in a reservoir of cyclopentadiene held at 0° C. in an ice-bath. Dicyclopentadienyliron was produced almost immediately and the solid product condensed in the cooler portion of the reaction tube. In the first 30 minutes, 0.72 g. of dicyclopentadienyliron was produced followed by 0.30 g. and 0.22 g., respectively, in the next two 30-minute periods. When the temperature was then changed to 400° C., 0.62 g. of dicyclopentadienyliron was produced in the next 30-minute period. A total of 1.86 g. of product was isolated in two hours representing an 18% yield based on the iron in the original ferrous oxalate.

*Example II*

Ten grams of ferrous oxalate dihydrate was heated to 375° C. in 17 minutes and treated with nitrogen gas containing cyclopentadiene monomer as in Example I. During the first 30 minutes of operation, 0.67 g. of dicyclopentadienyliron was produced followed by 0.44 and 0.20 g., respectively, during the next two 30-minute periods. Again, when the temperature was changed to 400° C., 0.33 g. of product was obtained followed by 0.15 g. in the last 30-minute period. This corresponds to a 17% yield of dicyclopentadienyliron based on the iron in the ferrous oxalate.

*Example III*

The experiment of Example I was repeated using 10 g. of a ferrous oxalate modified by 10 mole per cent of cadmium oxalate. This mixed oxalate was prepared by adding ammonium oxalate to a mixture of ferrous and cadmium chlorides in the mole ratio 1/0.1. At 350° C., the cadmium modified ferrous oxalate gave 1.10 g. of dicyclopentadienyliron in the first 30 minutes compared with 0.72 g. for the unmodified oxalate. The reaction was operated for 150 minutes during which time 3.23 g. of dicyclopentadienyliron was prepared equivalent to a 34% yield based on the iron in the original oxalate mixture.

*Example IV*

The experiment described in Example I was repeated with 10 g. of ferrous ammonium oxalate heated to 350° C. After 90 minutes at 350° C. and 40 minutes at 400° C., a total of 2.94 g. of dicyclopentadienyliron had been prepared corresponding to a 28% yield based on the iron present in the original ferrous ammonium oxalate.

*Example V*

The experiment described in Example I was repeated using 10 g. of anhydrous ferrous carbonate in place of the ferrous oxalate. At 350° C., 0.40 g. of dicyclopentadienyliron was prepared in 30 minutes and 2.49 g. in 4.5 hours. The total yield of dicyclopentadienyliron prepared corresponds to 15% of the iron present in the original ferrous carbonate.

*Example VI*

The experiment of Example I was repeated exactly as described. The reaction was operated for 15 minutes during which 0.39 g. of dicyclopentadienyliron was prepared. The remaining decomposed ferrous oxalate was found to be a fine black powder that was highly pyrophoric at room temperature. A sample was taken under nitrogen, covered with absolute alcohol and examined by electron diffraction. The analysis indicated ferrous oxide was the major component of the decomposed ferrous oxalate. The black powder was also only slightly magnetic, indicating that only minor amounts of magnetic iron oxides were present. The latter oxides were found not to give substantial amounts of dicyclopentadienyliron when employed as the iron source.

In the process of this invention, pyrophoric iron oxide in which substantial amounts of ferrous iron are present is required for reaction with cyclopentadiene. This active pyrophoric iron oxide is readily obtained by heating various ferrous salts of carbon-containing acids to temperatures at which they decompose. Particularly useful are the ferrous salts of saturated aliphatic carboxylic acids which acids except for the oxygen of the carboxylic groups have only hydrogen attached to carbon. Carboxylic acids of up to six carbons, e. g., hexanoic acid, can be used. It is usually convenient to employ those which decompose at temperatures which are employed for reaction with cyclopentadiene, i. e., temperatures of 300–450° C. The preferred source compounds for the pyrophoric iron oxides are ferrous carbonate, oxalate and formate, and mixed ferrous ammonium, or ferrous cadmium salts, e. g., ferrous cadmium oxalate and ferrous ammonium oxalate. The presence of other salts such as the oxalates of zinc, calcium, and tin, in the preparation of the pyrophoric iron oxide, gives active products. In these salts it is requisite that ferrous oxide be present in major amount. The decomposition of the salts to the pyrophoric ferrous oxide is brought about by heat in an inert atmosphere. If the ferrous oxide is prepared by heating the oxalate rapidly to 400° C. and holding at this temperature for 15 minutes under nitrogen, a magnetic iron oxide is formed that is unreactive toward cyclopentadiene and gives only a trace of dicyclopentadienyliron. However, when the oxalate is heated rapidly to 400° C. and immediately treated with cyclopentadiene in nitrogen, a pyrophoric, black powder is produced that is very reactive toward cyclopentadiene. This pyrophoric powder is only slightly ferromagnetic and may contain considerable carbon, e. g., 20%. Optimum results are obtained if cyclopentadiene is present during decomposition of the salt. A simple and effective technique for the preparation of the dicyclopentadienyliron by the process of this invention is the simultaneous preparation of the pyrophoric ferrous oxide and its reaction with cyclopentadiene.

The cyclopentadiene is reacted with the pyrophoric iron oxide advantageously in gas phase. Inert gases can be employed as diluents for the cyclopentadiene. The time of reaction is not critical. In a continuous process, for which this invention is well adapted, the contact time is of very short duration. The pyrophoric ferrous oxide can be employed for several hours to give the desired product. This invention can be practiced by passing cyclopentadiene vapor through a bed of pyrophoric ferrous oxide in a "fluidized bed" technique. The compound produced, dicyclopentadienyliron, sublimes at the temperatures employed in this process and is obtained by cooling of the effluent gaseous material. Crystalline dicyclopentadienyliron of high purity is directly obtained.

The amount of cyclopentadiene employed in the process of this reaction is sufficient to react with the active iron oxide. Since unreacted cyclopentadiene is readily recovered, it is obviously advantageous to employ the cyclopentadiene in an amount in excess of that calculated on the basis of iron present in the reaction zone. Cyclopentadiene can be generated from dicyclopentadiene for use in the process of this invention.

It is apparent from the preceding description that this process is well adapted to commercial use and avoids expensive and hazardous intermediates and solvents. The product of this invention is valuable as a substantially nontoxic antiknock agent for fuels employed in spark ignition engines. It can also be employed as a catalyst and a source of organoiron compounds.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of dicyclopentadienyliron which comprises bringing cyclopentadiene in contact at 300–450° C. with pyrophoric ferrous oxide.

2. A process for the preparation of dicyclopentadienyliron which comprises bringing cyclopentadiene in contact at 300–450° C. with iron oxide containing pyrophoric ferrous oxide in major amount and which is obtained in situ by decomposing a ferrous salt of an unsubstituted saturated aliphatic carboxylic acid of up to six carbon atoms at 300 to 450° C. in a cyclopentadiene atmosphere.

3. A process according to claim 1 wherein the pyrophoric ferrous oxide is obtained in situ by decomposing a ferrous carboxylate at 300–450° C. in a cyclopentadiene atmosphere.

4. A process according to claim 1 wherein the pyrophoric ferrous oxide is obtained in situ by decomposing ferrous oxalate at 300–450° C. in a cyclopentadiene atmosphere.

5. A process according to claim 1 wherein the pyrophoric ferrous oxide is obtained in situ by decomposing a ferrous oxalate at 300–450° C. in a cyclopentadiene atmosphere.

6. A process for the preparation of dicyclopentadienyliron which comprises heating ferrous oxalate at 300–450° C. in a stream of cyclopentadiene vapor.

7. A process for the preparation of dicyclopentadienyliron which comprises heating a ferrous salt of an unsubstituted aliphatic carboxylic acid at 300–450° C. in a stream of cyclopentadiene vapor.

8. A process for the preparation of dicyclopentadienyliron which comprises heating ferrous carbonate at 300–450° C. in a stream of cyclopentadiene vapor.

9. A process for the preparation of dicyclopentadienyliron which comprises heating a mixture of ferrous oxalate containing a minor amount of cadmium oxalate at 300–450° C. in a stream of cyclopentadiene vapor.

References Cited in the file of this patent

FOREIGN PATENTS 171,976 Great Britain _____ Oct. 4, 1921

OTHER REFERENCES

Mellor: Comprehensive Treatise on Inorganic and Theoretical Chemistry, vol. 13, part 2, page 709 (1934).

Miller et al.: J. Chem. Soc. (London), February 1952, pages 632–635.